(12) United States Patent
Hjelm

(10) Patent No.: US 8,423,002 B2
(45) Date of Patent: Apr. 16, 2013

(54) OBTAINING LOCATION SERVER ADDRESS ON A MOBILE DEVICE

(75) Inventor: Bjorn Hjelm, Livermore, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 12/958,925

(22) Filed: Dec. 2, 2010

(65) Prior Publication Data

US 2012/0142368 A1 Jun. 7, 2012

(51) Int. Cl.
*H04M 3/42* (2006.01)
*H04M 3/493* (2006.01)

(52) U.S. Cl.
USPC ........ 455/414.2; 455/418; 455/419; 455/420; 455/456.1; 455/456.2; 455/456.3; 455/456.5; 455/456.6; 455/457; 455/558; 370/310.2; 370/328

(58) Field of Classification Search .......... 455/418–420, 455/456.1–457, 550.1, 558, 414.2; 370/310.2, 370/328
See application file for complete search history.

(56) References Cited

U.S. PATENT DOCUMENTS

| | | | | |
|---|---|---|---|---|
| 6,044,349 A | * | 3/2000 | Tolopka et al. | 705/1.1 |
| 7,394,386 B2 | * | 7/2008 | Nowlan | 340/573.1 |
| 7,941,656 B2 | * | 5/2011 | Hans et al. | 713/2 |
| 2006/0114871 A1 | * | 6/2006 | Buckley et al. | 370/338 |
| 2006/0206586 A1 | * | 9/2006 | Ling et al. | 709/219 |
| 2008/0133762 A1 | * | 6/2008 | Edge et al. | 709/228 |
| 2008/0182592 A1 | * | 7/2008 | Cha et al. | 455/456.3 |
| 2009/0088181 A1 | * | 4/2009 | Savolainen | 455/456.1 |

OTHER PUBLICATIONS

UserPlane Location Protocol Draft Version 2.0—Nov. 18, 2009; Open Mobile Alliance OMA-TS-ULP-V2_0-20091118-D; 407 pages.
$3^{rd}$ Generation Partnership Project; Technical specification Group Core Network and Terminals; Characteristics of the Universal Subscriber Identity Module (USIM) application (Release 7); 3GPP TS 31.102 V7.3.0 (Dec. 2005); 177 pages.
cdma2000 Application on UICC for Spread Spectrum Systems; $3^{rd}$ Generation Partnership Project 2 "3GPP2", Version 1.0, Jun. 2006; 178 pages.

* cited by examiner

*Primary Examiner* — Steve D Agosta

(57) ABSTRACT

A mobile device may determine an address of a location server to use for location-based services to the mobile device. In one implementation, a mobile device may retrieve a service list that indicates services available to the mobile device and determine whether location-based services are enabled for the mobile device. The mobile device may additionally retrieve, from a file stored as part of a file structure associated with a smart card of the mobile device, a network address of a location server corresponding to the location-based services. The mobile device may connect to the location server to obtain location-based services from the location server.

19 Claims, 8 Drawing Sheets

OBTAINING LOCATION SERVER ADDRESS ON A MOBILE DEVICE

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email, web surfing, text messaging, location-based services, etc.).

Wireless networks may support location-based services, in which the location of a mobile device, such as a portable wireless telephone, is used to provide a service to the user. One example of a location-based service is a turn-by-turn navigation service in which directions to a selected destination are provided, based on the current location of the user, as the user navigates to the destination.

A location server may be used to provide location-based services for the mobile device. For example, the mobile device may communicate with the location server to improve the performance of a global positioning system (GPS) unit that is part of the mobile device through Assisted GPS (A-GPS). In A-GPS, GPS information from the GPS unit of the mobile device may be augmented with assistance information from the location server. The assistance information can include, for example, precise orbital information of the GPS satellites, precise time information, information describing local ionospheric conditions or other conditions affecting the GPS signal. In some A-GPS systems, the mobile device may additionally offload some of the GPS calculations to the server. Through A-GPS, more precise location information may be provided to the mobile device than if the mobile device uses only a local GPS unit.

The location server that is to be used by a particular mobile device may change based on factors such as the wireless carrier used by the mobile device or the current configuration of the wireless carrier's network.

DETAILED DESCRIPTION

The following detailed description refers to the accompanying drawings. The same reference numbers in different drawings may identify the same or similar elements. Also, the following detailed description does not limit the invention.

Implementations described herein may provide for portability of application server addresses, such as location servers, that provide services to mobile devices through a wireless network. In one implementation, a mobile device may retrieve a location server address as part of a bootstrap procedure or referenced in a service table from a network access application (NAA). The location server address may be stored in a universal integrated circuit card associated with the mobile device.

Figure 1:
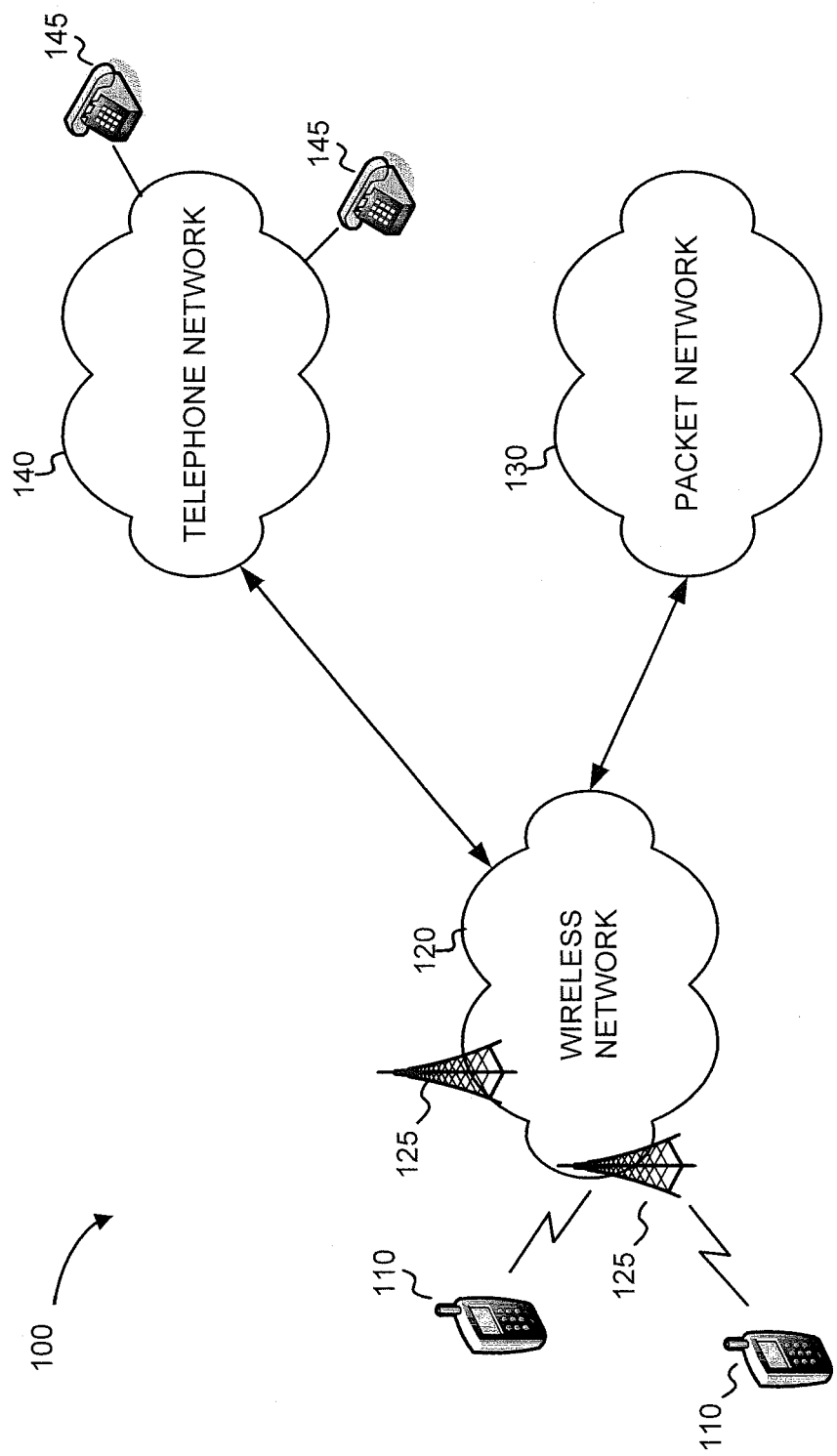
FIG. 1 is a diagram illustrating an example of a telecommunication system.

FIG. 1 is a diagram illustrating an example of a telecommunication system 100. Telecommunication system 100 may include a number of mobile devices 110, a number of networks, such as a wireless network 120, a packet network 130, and a wired telephone network 140.

Wireless network 120 may include a network designed to provide access to wireless communication devices, such as mobile devices 110. Wireless network 120 may include one or more base stations 125 that provide wireless connectivity to mobile devices 110. Mobile devices 110 may include, for example, mobile telephones, smart phones, electronic notepads, and/or personal digital assistants (PDAs). Mobile devices 110 may establish wireless communication sessions with base stations 125. The wireless communication sessions may be used for voice (e.g., telephone calls) or data sessions.

Wireless network 120 may be implemented based on a number of possible different standards. For example, wireless network 120 may be a GSM (Global System for Mobile Communications), UMTS (Universal Mobile Telecommunications System), CDMA (Code Division Multiple Access), or LTE (Long Term Evolution) based-network. The term "wireless" in wireless network 120 may refer to the wireless interface between base stations 125 and mobile devices 110. In general, components within wireless network 120 may be connected using wired or wireless connections. Wireless network 120 may connect to other networks, such as packet network 130 and telephone network 140.

Packet network 130 may include one more networks in which data is delivered using Internet Protocol (IP) packets. Packet network 130 may connect to one or more server or end-user devices. Packet network 130 may include routers, gateways, and other network devices that are used to implement packet network 130. In one example, packet network 130 may include the Internet.

Telephone network 140 may include traditional circuit-switched telephone networks. Telephone network 140 may connect to conventional telephones, such as telephones 145, connected through plain old telephone service (POTS) connections.

Telephone network 140 may include, for example, Inter-Exchange Carrier (IXC) networks and/or Local-Exchange Carrier (LEC) networks. IXCs and LECs may carry either or both analog or digital traffic. As a LEC, telephone network 140 may include networks designed to connect calls with landline or wired telephones. A LEC may be managed and maintained by, for example, a regional telephone carrier that handles the management of local telephone lines and the provisioning of local phone services within the area served by the LEC. As an IXC, telephone network 140 may include a network for carrying traffic, such as voice or data traffic, between telephone exchanges (i.e., LECs) and/or wireless network 120.

Although FIG. 1 illustrates an example of components of telecommunication system 100, in other implementations, telecommunication system 100 may include additional, fewer, different, or differently arranged components than those illustrated in FIG. 1 and described herein. Moreover, one or more components shown in FIG. 1 may perform one or more tasks described herein as being performed by another component.

Figure 2:
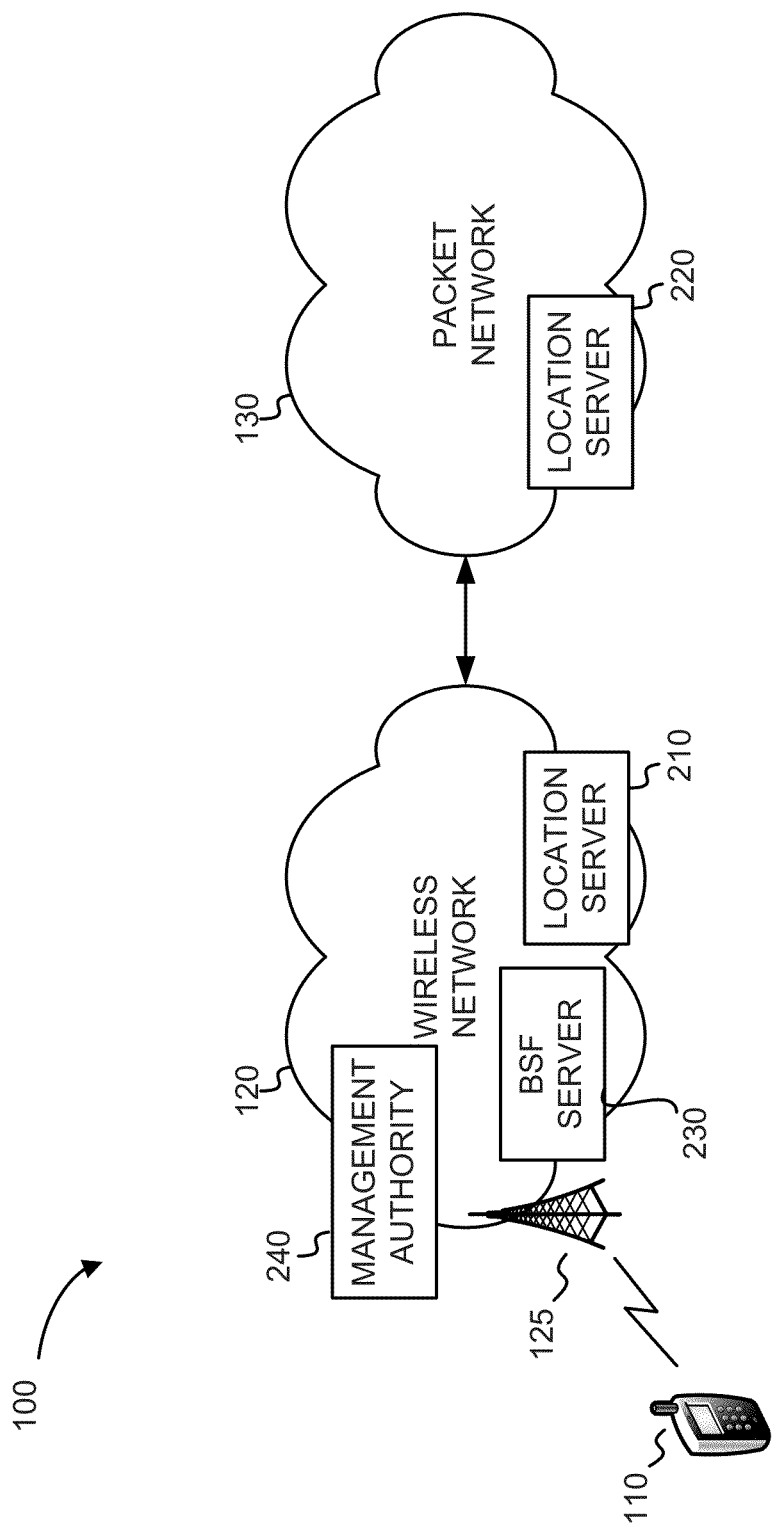
FIG. 2 is a diagram illustrating an example of components in a telecommunication system that may be relevant to location-based network services.

FIG. 2 is a diagram illustrating an example of components in telecommunication system 100 that may be relevant to location-based network services. Telecommunication system 100 may include location servers, such as location servers 210 and/or 220, a bootstrap server function (BSF) server 230, and a management authority server 240. Location servers 210 and 220 may include servers that provide location-based network services to mobile devices 110. Location servers 210/220 may communicate with mobile devices 110 to, for example, enhance the GPS capabilities of mobile devices 110 through A-GPS techniques. Location servers 210/220 may provide other location-based services to mobile devices 110, such as directly providing maps, traffic information, or other information generated based on the geographical locations of mobile devices 110. Location servers 210/220, as illustrated in FIG. 2, may be located wireless network 120 and packet network 130, respectively. In some implementations, location servers 210/220 may be located in other networks or in only one of wireless network 120 and packet network 130. Mobile device 110 may initially contact a location server 210/220 when, for example, mobile device 110 is powered-up and mobile device 110 is subscribed to a service that uses a location server.

Management authority server 240 may be a server associated with mobile device 110 that has authority to perform management functions relating to mobile device 110. Management authority server 240 may, for example, be able to provision mobile device 110 and change access rights associated with mobile device 110.

Figure 3:
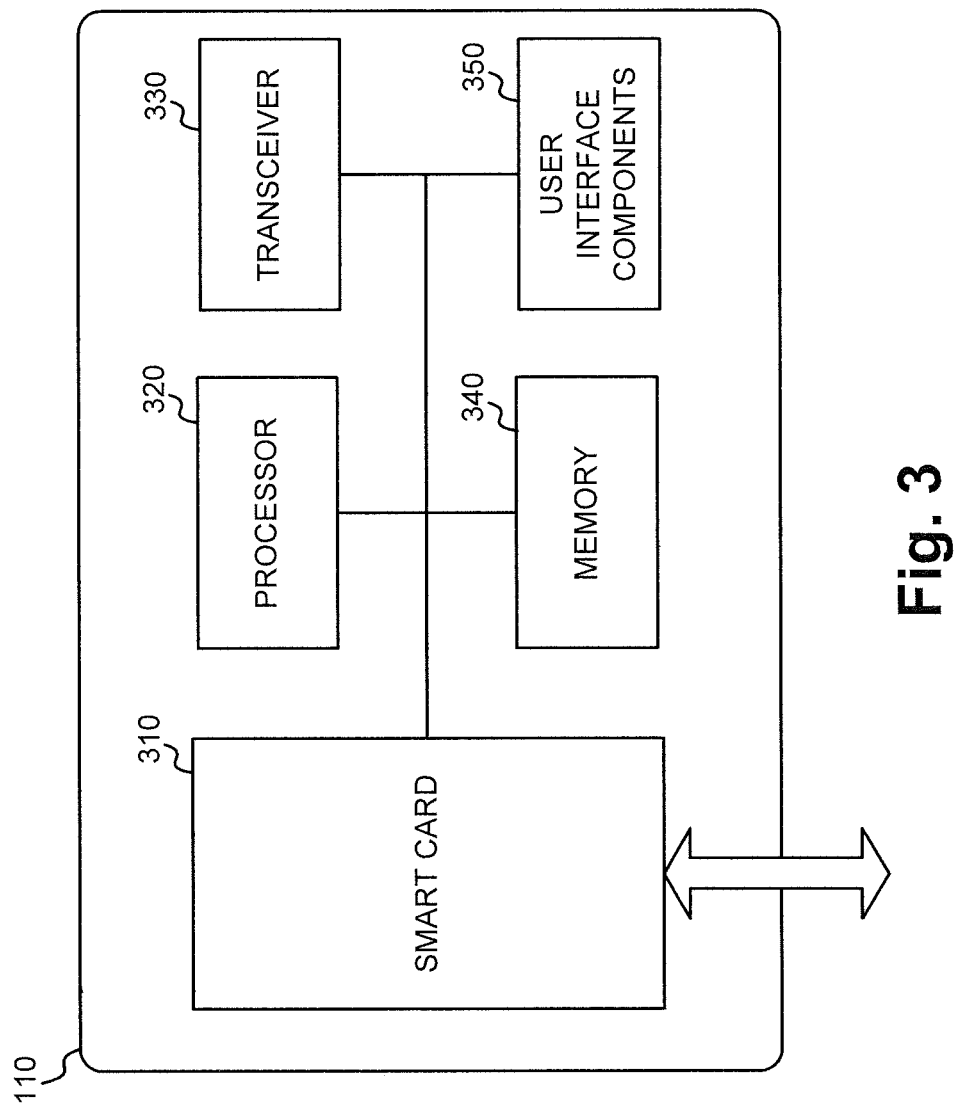
FIG. 3 is a diagram illustrating an example of an implementation of a mobile device illustrated in FIG. 1.

FIG. 3 is a diagram illustrating an example of an implementation of a mobile device 110. Mobile device 110 may include a smart card 310, one or more processors 320, a transceiver 330, a memory 340, and user interface components 350.

Smart card 310 may include a removable memory and/or processing device that may be used to customize mobile device 110. Smart card 310 may securely store personal data that the user enters or downloads to mobile device 110. Smart card 310 may additionally store configuration information for mobile device 110, such as the phone number of the mobile device, message service parameters, hardware identifiers, analog operation parameters, network information, and/or a list of available or subscribed services. Through smart card 310, a subscriber can move their account from one phone to another by switching the smart card. When used in a GSM or UMTS network, smart card 310 may be referred to as a universal integrated circuit card (UICC).

Access to smart card 310 by mobile device 110 may be through one or more applications running on smart card 310, called network access applications (NAAs). Thus, smart card 310 may host one or more NAAs. Depending on the type of wireless network 120, the NAA may commonly be referred to as a SIM (GSM network), a USIM (UMTS network), or a CSIM (CDMA network).

Processor 320 may include a processor, a microprocessor, or processing logic (e.g., an application specific integrated circuit (ASIC) or a field programmable gate array (FPGA)) that may interpret and execute instructions. Transceiver 330 may send and receive data wirelessly with wireless network 120. Transceiver 330 may include, for example, an antenna, a transmitter, and a receiver.

Memory 340 may include a random access memory (RAM) or another type of dynamic or non-volatile storage device that may store data and instructions for execution by processor 320.

User interface components 350 may include components for providing output to or receiving information from a user of mobile device 110. User interface components 350 may include, for example, a display or touch-sensitive display, a microphone, a speaker, buttons, and/or other components used to communicate with the user. User interface components 350 may also include circuitry used to control the display, microphone, speaker, and/or the buttons.

Although FIG. 3 illustrates an example of components of mobile device 110, in other implementations, mobile device 110 may include additional, fewer, different, or differently arranged components than those illustrated in FIG. 3 and described herein. Moreover, one or more components shown in FIG. 3 may perform one or more tasks described herein as being performed by another component.

Figure 4:
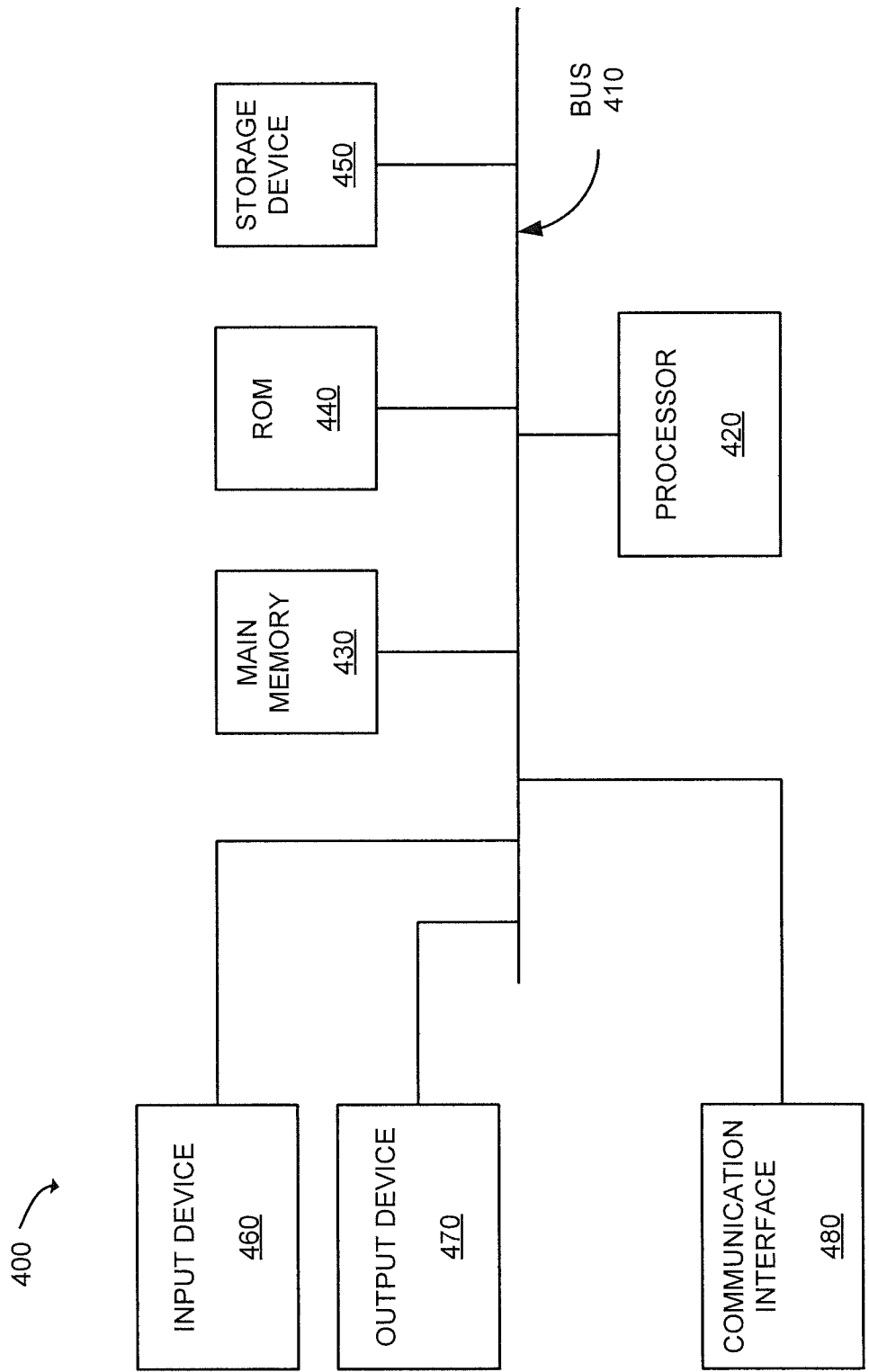
FIG. 4 is a diagram of exemplary components of a device, which may correspond to a network device such as a location server, shown in FIG. 2.

FIG. 4 is a diagram of exemplary components of a device 400, which may correspond to a network device such as location server 210/220 and/or management authority server 240. As shown in FIG. 4, device 400 may include a bus 410, a processor 420, a main memory 430, a read only memory (ROM) 440, a storage device 450, an input device 460, an output device 470, and a communication interface 480.

Bus 410 may include a path that permits communication among the components of device 400. Processor 420 may include a processor, a microprocessor, or processing logic (e.g., an application specific integrated circuit (ASIC) or a field programmable gate array (FPGA)) that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive, or a removable form of memory, such as a flash memory.

Input device 460 may include a mechanism that permits an operator to input information to device 400, such as a keyboard, a mouse, a button, a pen, a touch screen, voice recognition and/or biometric mechanisms, etc. Output device 470 may include a mechanism that outputs information to the operator, including a display, a light emitting diode (LED), a speaker, etc. Communication interface 480 may include any transceiver-like mechanism that enables device 400 to communicate with other devices and/or systems. For example, communication interface 480 may include mechanisms for communicating with another server. In some implementations, input device 460 and/or output device 470 may not be implemented by device 400. For example, device 400, when implementing locations servers 210/220, BSF server 230, or management authority 240, may be a "headless" device that does not explicitly include an input or an output device.

Although FIG. 4 illustrates exemplary components of device 400, in other implementations, device 400 may include additional, fewer, different, or differently arranged components than those illustrated in FIG. 4 and described herein.

Figure 5:
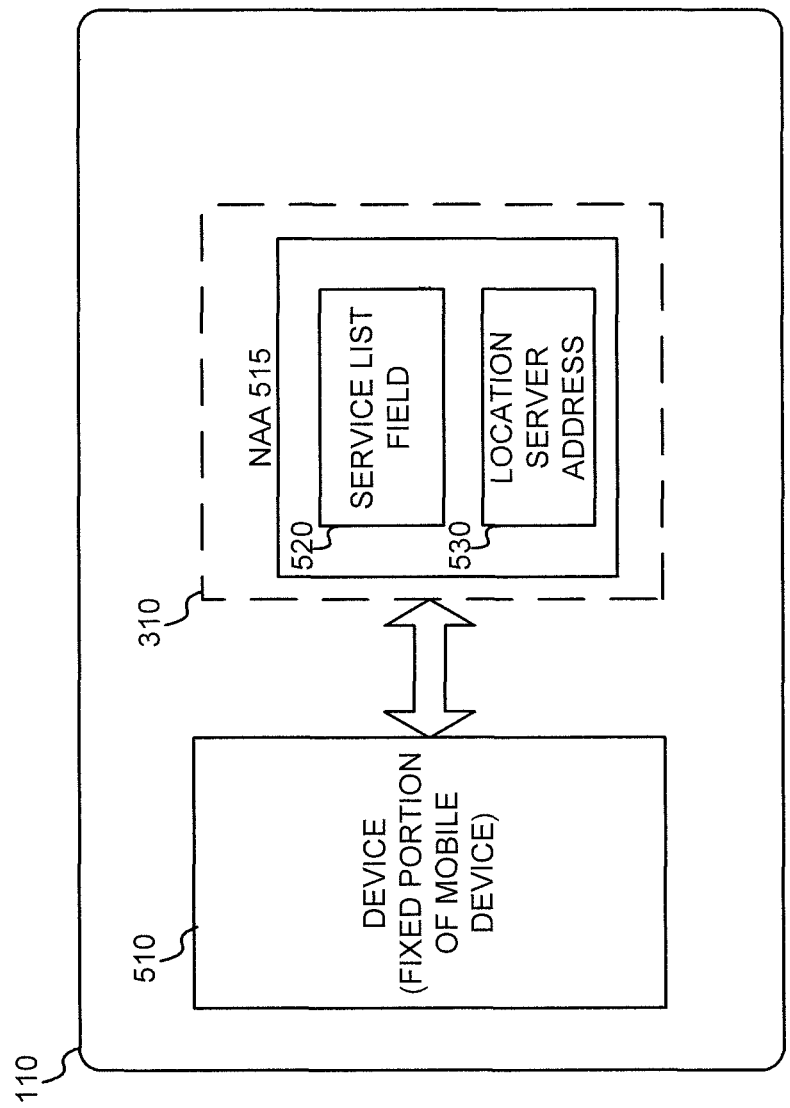
FIG. 5 is a diagram illustrating an example of an implementation of a mobile device.

FIG. 5 is a diagram illustrating an example implementation of mobile device 110. In FIG. 5, smart card 310 is particularly illustrated in more detail. Components of mobile device 110 other than smart card 310 (i.e., processor 320, transceiver 330, memory 340, and user interface components 350) are represented in FIG. 5 as device 510.

As previously mentioned, smart card 310 may include one or more NAAs 515 (one NAA 515 is particularly shown in FIG. 5) through which device 510 may access smart card 310. NAA 515 may provide storage elements, such as a file structure that can be accessed by device 510. The file structure may include information relating to wireless network 120. The file structure may be accessed through predetermined commands issued by mobile device 110 (i.e., by device 510 to smart card 310). The file structure may include a service list field 520 that indicates services available to mobile device 110. If a service is not indicated as available in service list field 520, mobile device 110 may not implement the service. One service that may be listed in the service list includes the service "IP-Based Location Services," which may indicate whether location-based services are available to be provided through location servers 210/220. As previously mentioned, location servers 210/220 may provide location-based services, such as A-GPS services to mobile device 110. NAA 515 may provide service list field 520 as a data structure that includes a list of services that are available to mobile device 110. The file structure maintained by NAA 515 may also include a location server address field 530. An address of location servers 210/220 may be stored in location server address field 530. In one implementation, the address may be stored in location server address field 530 as an IP address or as a fully qualified domain name.

Although FIG. 5 illustrates exemplary components of mobile device 110, in other implementations, mobile device 110 may include additional, fewer, different, or differently arranged components than those illustrated in FIG. 5 and described herein. Moreover, one or more components shown in FIG. 5 may perform one or more tasks described herein as being performed by another component.

Figure 6:
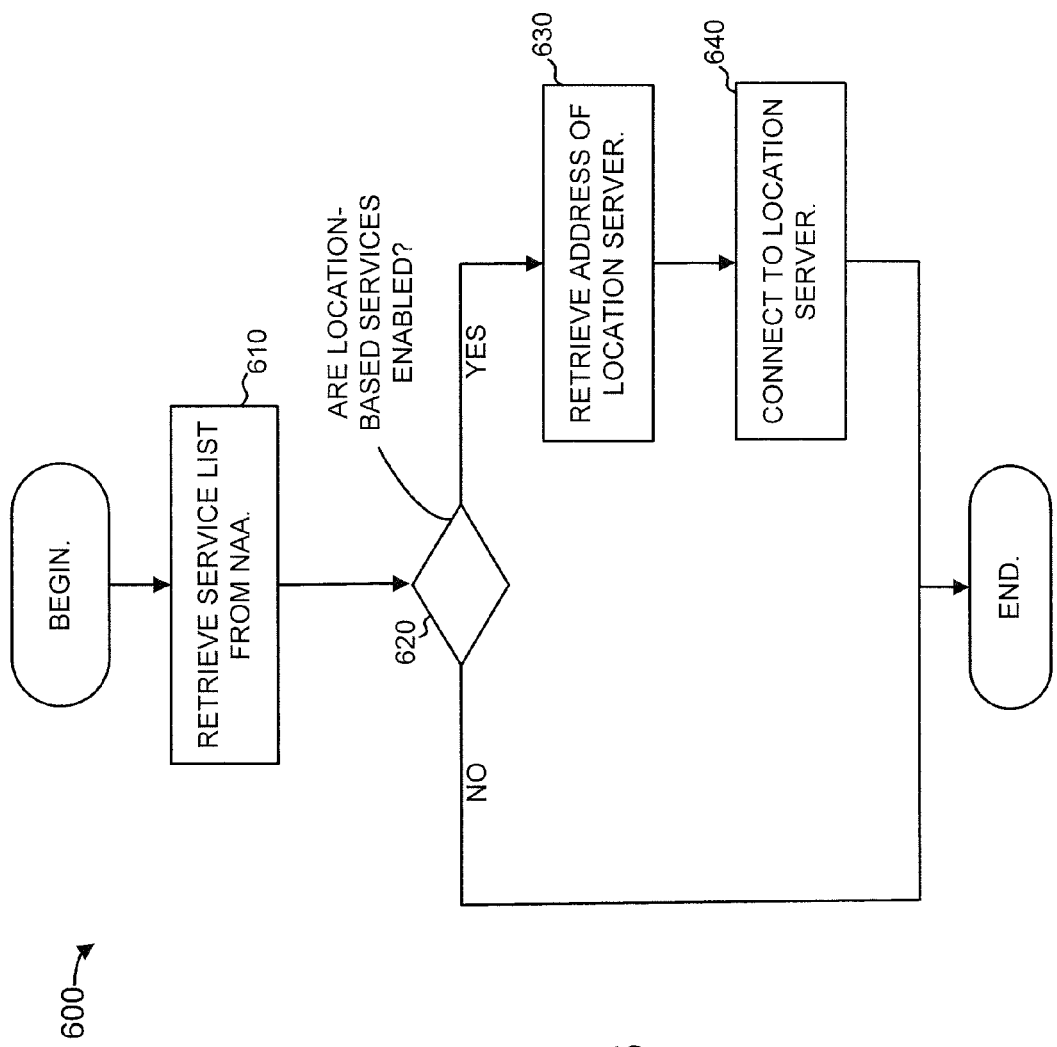
FIG. 6 is a flow chart illustrating an example process for connecting with a location server by a mobile device.

FIG. 6 is a flow chart illustrating an exemplary process 600 for connecting with a location server 210/220 by mobile device 110.

Process 600 may include retrieving service list field 520 from NAA 515 (block 610). Service list field 520 may indicate whether location-based services are supported by mobile device 110.

Figure 7:
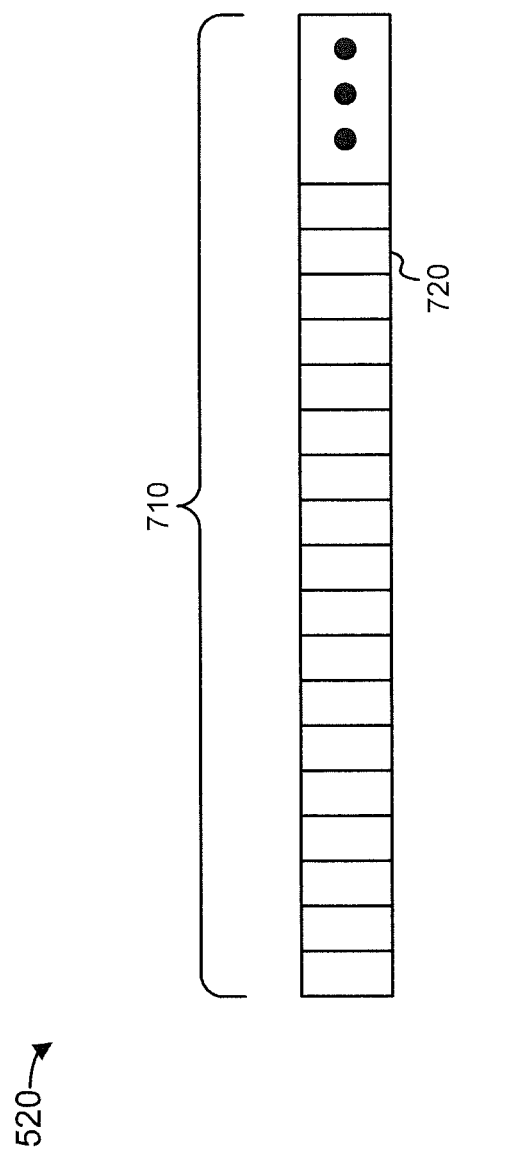
FIG. 7 is a diagram illustrating an example service list field.

FIG. 7 is a diagram illustrating an example service list field 520. Service list field 520 may include a number of bits 710, each of which may correspond to a pre-determined service. When NAA 515 is a USIM, for instance, bit 17, labeled as bit 720 in FIG. 7, may correspond to IP-based Location Services. When bit 720 is set, mobile device 110 may support IP-based Location Services, such as services implemented through location server 210/220.

Returning to FIG. 6, if location-based services are enabled for the device (e.g., bit 720 is set), mobile device 110 may retrieve the address of location server 210/220 from NAA 515 (blocks 620—YES, and block 630). As previously mentioned, the address of location server 210/220 may be stored as a file in the file structure maintained by NAA 515 as location server address 530. The file corresponding to location server address 530 may be set to have access rights or permissions that allow only management authority server 240 to change location server address 530. In this situation, a user of mobile device 110 may not be allowed to change location server address 530. Management authority server 240 may make changes to location server address 530 during, for example, initial boot-up of mobile device 110 or at a later time during normal operation of mobile device 110.

Mobile device 110 may use the read address to connect to location server 210/220 and to begin the location-based services (block 640). For example, when the address of location server 210/220 is stored in location server address 530 as an IP address, mobile device 110 may directly contact location server 210/220 using the IP address When the address of location server 210/220 is stored in location server address 530 as a fully qualified domain name, mobile device 110 may first resolve the domain name to an IP address by looking up the domain name through a domain name server.

Location server address 530 may be initially set on smart card 310 as part of initial provisioning of mobile device 110 or post-provisioned via over-the-air (OTA) communication with management authority 240.

As described above with respect to FIGS. 5-7, the address of a location server for a mobile device may be provisioned, updated, and used based on storage of the address at a smart card that is inserted in the mobile device. The address of the location server may be particularly stored in the file structure of an NAA. The address of the location server is portable in the sense that the address can be updated as needed by the wireless provider.

Figure 8:
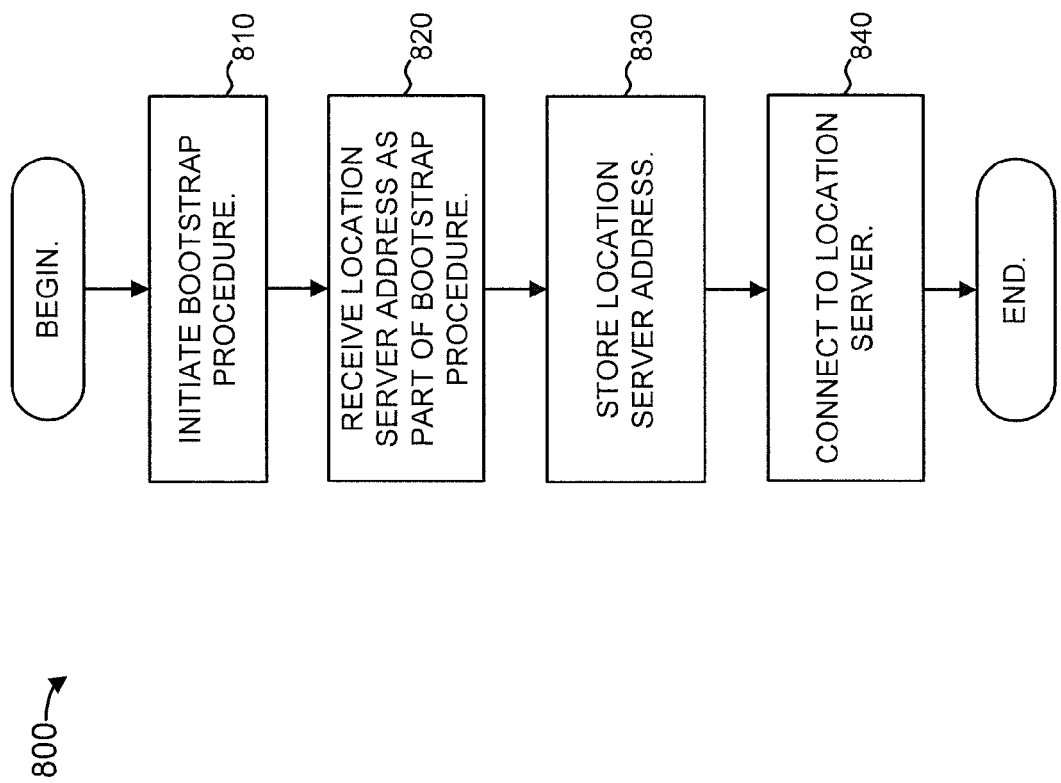
FIG. 8 is a flow chart illustrating another example process for connecting with a location server by a mobile device.

FIG. 8 is a flow chart illustrating another example process 800 for connecting with a location server 210/220 by mobile device 110.

Process 800 may include mobile device 110 beginning a bootstrap procedure (block 810). The bootstrap procedure may involve contacting a bootstrap-server or other server device to obtain information relating to additional services that may be implemented by mobile device 110. BSF server 230 may act as an intermediary element in wireless network 120 that provides application independent functions for mutual authentication of mobile devices and application servers to each other and for "bootstrapping" the exchange of secret session keys afterwards. The bootstrap procedure may be initiated, for example, during initial power-up of mobile device 110 or in response to a message from wireless network 120 instructing mobile device 110 to begin a bootstrap operation.

Process 800 may include receiving the address of location server 210/220 as part of the bootstrap procedure (block 820). The address of location server 210/220 may be received from BSF server as part of the bootstrap procedure.

Process 800 may include receiving the address of location server 210/220 as part of the bootstrap procedure (block 820). The address of location server 210/220 may be received from BSF server 230 as part of the bootstrap procedure.

Process 800 may further include storing the address of the received location server (block 830). The address may be stored, for instance, in smart card 310. Alternatively, the address may be stored in a memory such as memory 340 of mobile device 110. In either case, the address of the location server may be securely stored by mobile device 110. For example, a file corresponding to the address of the location server may be stored through NAA 515 of smart card 310 and may be set to have access rights or permissions that allow only management authority server 240 to change the location server address. In this situation, a user of mobile device 110 may not be allowed to change location server address 530.

Mobile device 110 may use the read address to connect to location server 210/220 and to begin the location-based services (block 840). For example, when the address of location server 210/220 is stored in location server address 530 as an IP address, mobile device 110 may directly contact location server 210/220 using the IP address. When the address of location server 210/220 is stored in location server address 530 as a fully qualified domain name, mobile device 110 may first resolve the domain name to an IP address by looking up the domain name through a domain name server.

As described above with respect to FIG. 8, the address of a location server can be dynamically received through a bootstrap procedure performed with a bootstrap server function (BSF) server in a network. The address of the location server is portable in the sense that the address can be updated as needed by the wireless provider.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 6 and 8, the order of the blocks may be modified in other embodiments. Further, non-dependent blocks may be performed in parallel.

It will be apparent that aspects, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented on a mobile device, the method comprising:
    retrieving, from a network access application running on a smart card inserted into the mobile device, a service list that indicates services available to the mobile device;
    determining, by the mobile device and based on a determination that a predetermined bit is set in the service list, that location-based services including turn-by-turn navigation services are enabled for the mobile device;
    retrieving, from a file stored in a file structure associated with the network access application, a first network address of a first location server corresponding to the location-based services, wherein the file identifies access rights that allow modification of the file by a management authority associated with a wireless provider;
    connecting, by the mobile device and based on the first network address provisioned in the file by the management authority, to the first location server to obtain first ones of the location-based services from the first location server;
    updating the file, responsive to the management authority, to change the first network address to a second network address of a second location server corresponding to the location-based services; and
    connecting, by the mobile device and based on the second network address updated in the file, to the second location server to obtain second ones of the location-based services from the second location server.

2. The method of claim 1, wherein the identified access rights do not allow medication of the file by a user of the mobile device.

3. The method of claim 1, wherein the first network address is stored as a domain name, the method further comprising:
    resolving the domain name to an Internet protocol (IP) address, by performing a lookup in a domain name server, wherein the IP address corresponds to the first network address.

4. The method of claim 1, where the smart card includes a universal integrated circuit card.

5. The method of claim 1, wherein the location-based services include assisted global positioning system information.

6. A mobile device comprising:
    one or more processors;
    a smart card coupled to the mobile device to be removable from the mobile device, the smart card implementing a network access application; and
    a memory to store instructions for execution by the processor, the instructions causing the one or more processors to:
        retrieve, from the network access application, a service list that indicates services available to the mobile device,
        determine, based on a predetermined indicator set in the service list, that location-based services including turn-by-turn navigation services are enabled for the mobile device,
        retrieve, from a file stored in a file structure associated with the network access application, a first network address of a first location server corresponding to the location-based services, wherein the file identifies access rights that allow modification of the file by a management authority associated with a wireless provider,
        connect, based on the first network address provisioned in the file by the management authority, to the first location server to obtain first ones of the location-based services from the first location server;
        update the file, responsive to the management authority, to change the first network address to a second network address of a second location server corresponding to the location-based services; and
        connect, by the mobile device and based on the second network address updated in the file, to the second location server to obtain second ones of the location-based services from the second location server.

7. The mobile device of claim 6, wherein the identified access rights do not allow modification of the file by a user of the mobile device.

8. The mobile device of claim 6, where the smart card includes a universal integrated circuit card.

9. The mobile device of claim 6, wherein the location-based services include assisted global positioning system information.

10. A method implemented on a mobile device, the method comprising:
    contacting, by the mobile device, a bootstrap server function server to obtain information relating to services offered to the mobile device;
    receiving, by the mobile device and from the bootstrap server function server, a network address of a first location server that offers a plurality of location-based services for the mobile device;

determining, by the mobile device and based on a determination that an indicator is set in the obtained information, that the location-based services include turn-by-turn navigation services;

storing, by the mobile device, the received network address of the first location server in a smart card, associated with the mobile device, in a file that identifies access rights that do not allow changing of the file by a user of the mobile device;

connecting, by the mobile device and based on the stored network address, to the first location server to obtain first ones of the plurality of location-based services from the first location server;

changing, responsive to a management authority, the stored network address to an updated network address of a second location server corresponding to the plurality of location-based services; and connecting, by the mobile device and based on the updated network address, to the second location server to obtain second ones of the plurality of location-based services from the second location server.

11. The method of claim 10, wherein storing the received network address includes securely storing the received network address in the smart card.

12. The method of claim 11, wherein securely storing the received network address includes storing the received network address in a file that identifies access rights that are set to allow changing of the file by the management authority.

13. The method of claim 10, wherein storing the received network address includes resolving a domain name to an Internet protocol (IP) address, by performing a look-up in a domain name server, wherein the IP address corresponds to the stored network address.

14. The method of claim 10, where the smart card includes a universal integrated circuit card.

15. The method of claim 10, wherein the plurality of location-based services include assisted global positioning system information.

16. A mobile device comprising:
one or more processors;
a smart card coupled to the mobile device to be removable from the mobile device; and
memory to store instructions for execution by the processor, the instructions causing the one or more processors to:
contact a bootstrap server function server to obtain information relating to services offered,
receive, from the bootstrap server function server, a network address of a first location server that offer a plurality of location-based services for the mobile device,
determine, by the mobile device and based on an indicator in the obtained information, that the location-based services include turn-by-turn navigation services,
store the received network address of the first location server on the smart card in a file that includes access rights that do not allow changing of the file by a user of the mobile device,
connect, based on the stored network address, to the first location server to obtain first ones of the plurality of location-based services from the first location server,
change, responsive to a management authority, the stored network address to an updated network address of a second location server corresponding to the plurality of location-based services; and
connect, by the mobile device and based on the updated network address, to the second location server to obtain second ones of the plurality of location-based services from the second location server.

17. The mobile device of claim 16, wherein storing the received network address includes securely storing the received network address in the smart card.

18. The mobile device of claim 17, wherein securely storing the received network address includes storing the received network address in a file that identifies access rights that are set to allow changing of the file by the management authority.

19. The mobile device of claim 16, where the smart card includes a universal integrated circuit card.

* * * * *